R. B. FULTON.
LOADER AND STACKER.
APPLICATION FILED JULY 17, 1909.
975,849.
Patented Nov. 15, 1910.
4 SHEETS—SHEET 3.
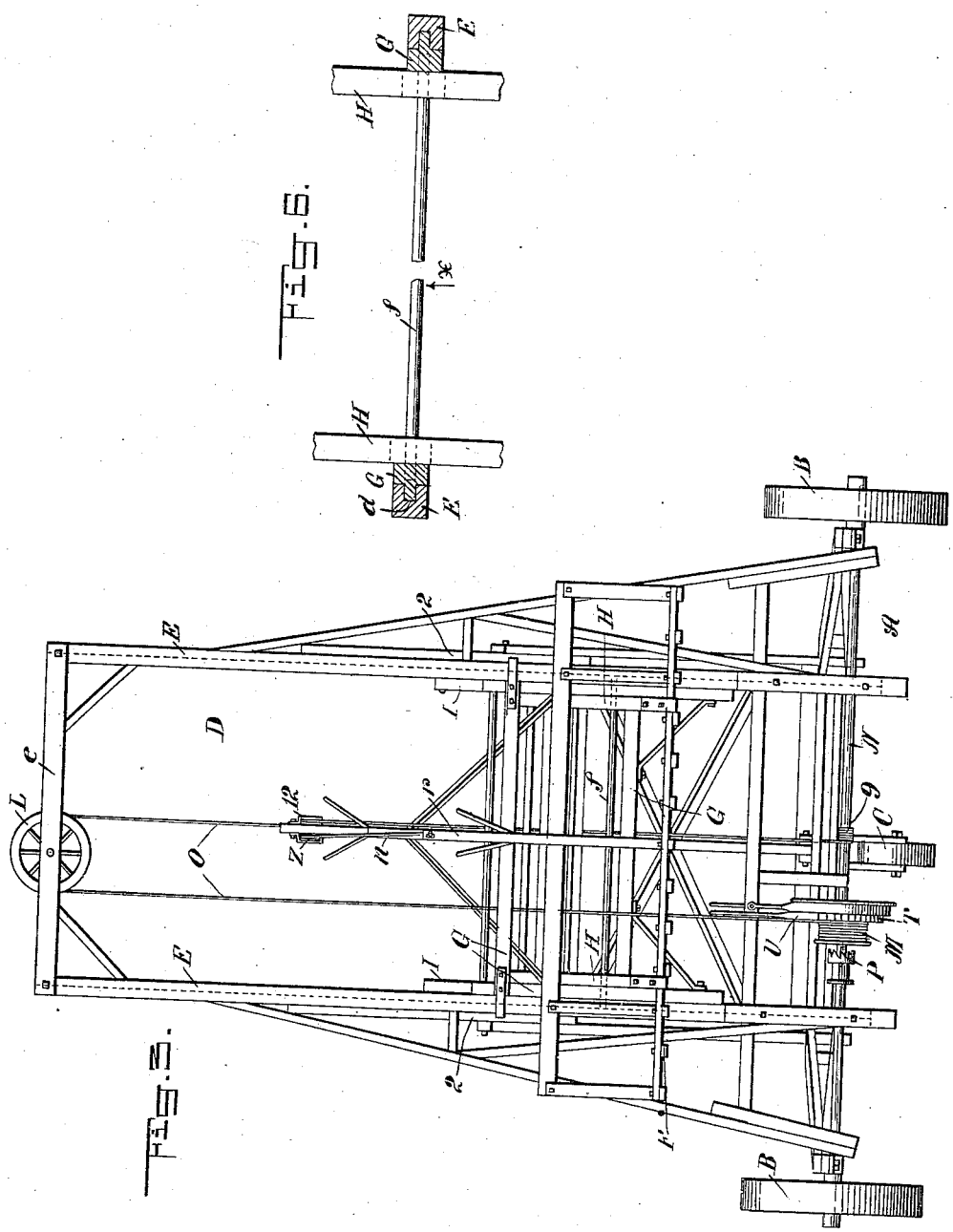
WITNESSES
INVENTOR
Robert B. Fulton
BY
ATTORNEYS

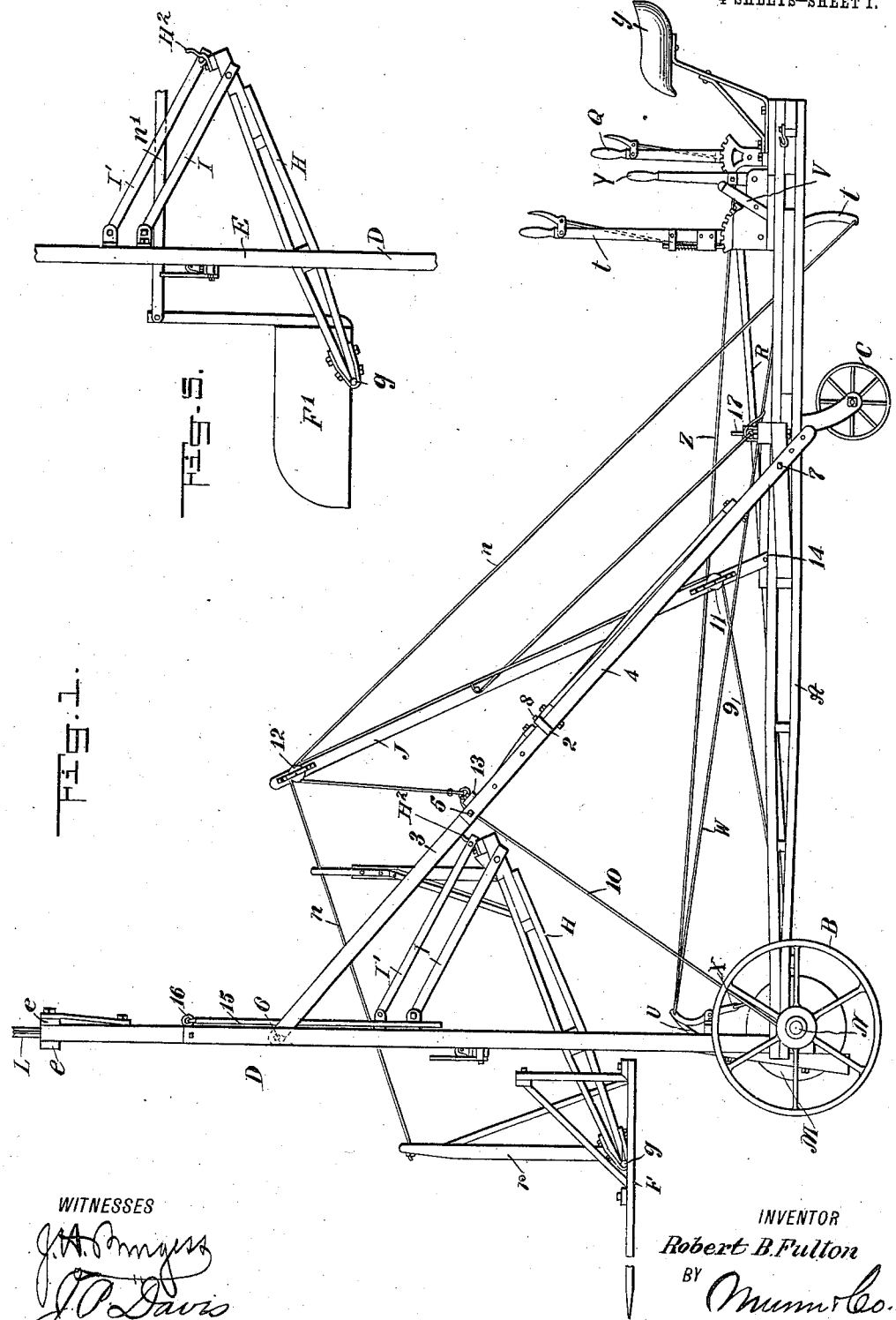

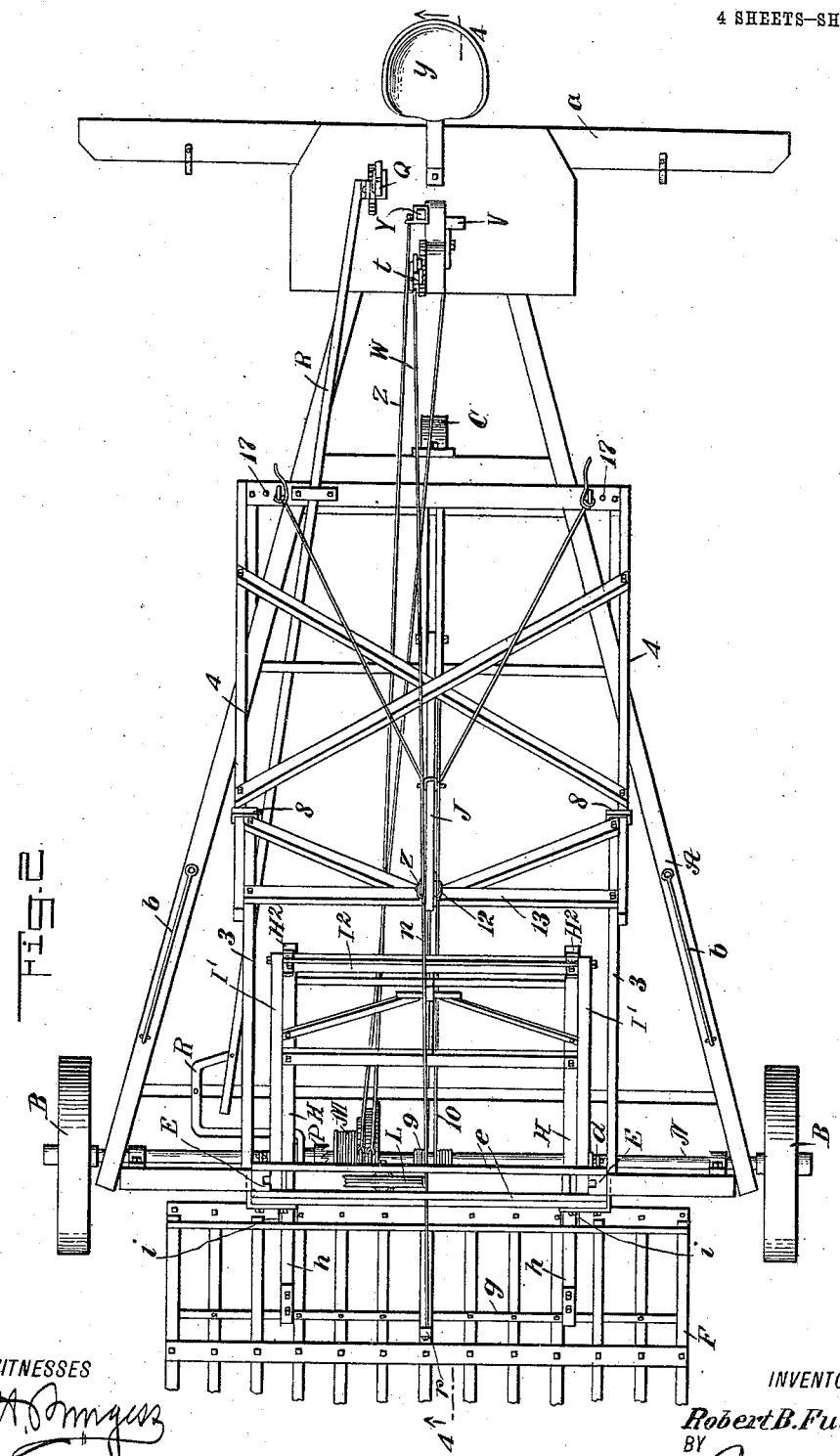

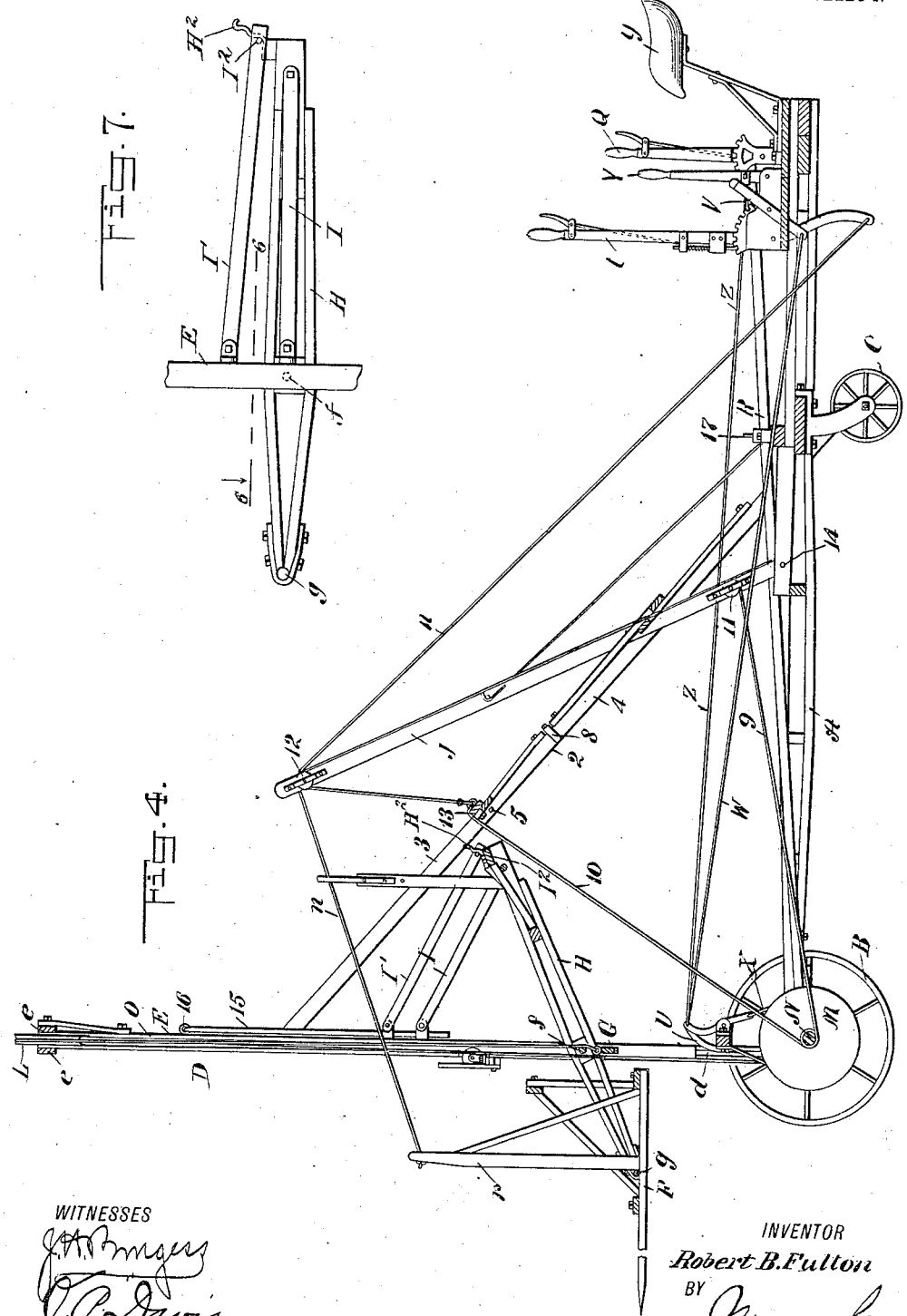

UNITED STATES PATENT OFFICE.

ROBERT BARTON FULTON, OF RED CLOUD, NEBRASKA.

LOADER AND STACKER.

975,849.

Specification of Letters Patent.   Patented Nov. 15, 1910.

Application filed July 17, 1909.   Serial No. 508,154.

*To all whom it may concern:*

Be it known that I, ROBERT B. FULTON, a citizen of the United States, and a resident of Red Cloud, in the county of Webster and State of Nebraska, have invented a new and Improved Loader and Stacker, of which the following is a full, clear, and exact description.

This invention relates to a machine of the loader and stacker order, which by reason of its novel construction is capable of performing efficiently the work of a number of machines heretofore employed for different though allied purposes. Thus my machine serves not only as a hay stacker or loader, but also as a hay sweep. It may also be used to advantage as a manure or snow shovel; for loading baled hay or ear corn, and for many other purposes involving the elevation and transportation of material.

The object of the invention is so to combine in one machine the scope and usefulness of a number of machines heretofore usually designed specially for the various purposes, and yet to attain a degree of simplicity with strength that will recommend the machine from every practical standpoint.

The machine comprises a wheeled base, a forward projecting load holding device, preferably of a "load acquiring" nature, such as a horizontal rake or a scoop shovel, which gathers the material as the machine is advanced, means whereby the load holding device is elevated and means whereby it is tilted. The means for elevating the load-holding device, the manner of supporting the same, the construction and arrangement of various of the structural elements of the machine, all as described hereinafter and more particularly pointed out in the claims, are among the features of novelty of the invention.

Reference is to be had to the accompanying drawings forming a part of this specification, in which similar characters of reference indicate corresponding parts in all the views.

Figure 1 is a side elevation of the machine; Fig. 2 is a top plan thereof; Fig. 3 is a front view thereof; Fig. 4 is a vertical, longitudinal section on the line 4—4 in Fig. 2; Fig. 5 is a plan view of the forward part of the machine, showing a shovel substituted for the rake shown in Figs. 1, 2 and 4; Fig. 6 is a partly sectional plan view of details of the main frame, substantially on the line 6—6 in Fig. 7; and Fig. 7 is a fragmentary side view of parts seen opposite the arrow $x$, in Fig. 6, showing the relation of a rocker, limbs, and auxiliary members that are details of the invention.

Referring now to the drawings, A indicates any suitable form of wheeled base, which may have two forward supporting wheels B and one rear wheel C. This base may be propelled by horses at opposite sides thereof, harnessed to doubletrees (not shown) that may be connected to holdbacks $b$.

Extending upward from the forward part of the base A is a guide frame D, preferably comprising two laterally spaced standards E, which may have longitudinal guide grooves $d$ on their inner faces. The tops of the standards E may be connected by spaced cross-bars $e$.

Two forms of load acquiring and holding devices are shown, namely a horizontal rake F and a scoop shovel F', both of which implements are open in front so as to slide beneath material on the ground as the machine advances. For snow clearing purposes the shovel F' should be the full width of the machine. This load-holding device is both raisable and tiltable, and the preferable instrumentalities contributing to this result are as follows:—G is a vertically slidable frame movable on the frame members E by means of tongues received in the grooves $d$. H is a rocker pivoted immediately to the frame G, as by means of a rod or shaft $f$. Journaled in the forward end of this rocker is a rod or shaft $g$, to which is secured the rake F or the shovel F'. To the rear end of the rocker H is pivoted a link, or links, I, also pivoted to the frame D. Consequently, as the frame G is raised, the link, or links I cause the rocker to incline upward and forward, and when the frame G is depressed the rocker is caused to incline downward and forward. Thus, the range of vertical movement of the devices F or F', carried by the forward portion of the rocker H, is considerably greater than the extent of movement of the frame G. Preferably, though not necessarily, the rocker H comprises two side bars or levers $h$, and a link I is pivoted to each of these bars. In Fig. 2 are indicated slots or openings $i$ in the back bar $m$ of the rake F, to permit the levers $h$ to pass therethrough when the parts are elevated. Preferably, the devices F, F' are supported pivotally on the shaft $g$ at the rear of their centers of gravity when loaded, so that the tendency of the loaded device will be to tilt forward. To control the tilting of the rake F, I provide a cable $n$, the forward end of which may be secured to a bar $r$ projecting upward from the rake, and the rear end of which may be secured to the lower end of an operating lever $t$ located near the operator's seat $y$. The cable $n$ may pass over a sheave $z$ mounted on the upper end of a mast J.

When the rocker H and links I are horizontal as shown in Fig. 7, there is a tendency for the weight carried by the receptacle F, F' to tilt the rocker forward and downward, and the links I correspondingly. This would lock the parts against further upward movement. To obviate this tendency I provide auxiliary links I' which are in effect braces. The links I' are pivoted to the standards E, but in a different horizontal plane from the links I. Preferably they are pivoted to the standards above the links I. When the rocker H is horizontal, the auxiliary links or braces I' are adapted to coöperate with a part of the rocker, to brace the latter against the tilting action referred to. While this may be accomplished in a variety of ways, I have illustrated a construction in which the rear end of the rocker H is provided with one or more hooked or curved stops $H^2$, which are adapted to receive and bear against a rod $I^2$ connecting the rear ends of the braces I'. It will be seen that the braces thus prevent all downward and forward tilting of the rocker H, about the rod $f$ as a fixed pivot.

In Fig. 5, I have indicated a rigid bar $n'$ as a substitute for the flexible cable $n$, such connection being desirable with a shovel, inasmuch as it enables the operator to hold the shovel steady as the advance of the machine forces it into snow or manure, and also to force the shovel down into the material.

The raising and lowering of the frame G is effected in the following manner: L is a sheave journaled in the top of the frame D, conveniently between the cross-bars $e$. M is a hoisting drum loose on the revoluble shaft or axle N connecting the wheels B. From this drum a cable O extends upward over the sheave L, thence downward to the frame G, to which it is attached. A slidable clutch member P, operated by a lever Q near the operator's seat and connections R, serves to couple and uncouple the drum with respect to this axle, that is, with respect to a supporting wheel of the wheeled base A. A ratchet T is rigid with the drum M and coöperates with a pawl or latch U, which is adapted to be released by an operating lever V, near the operator's seat, and a connection W. A brake X, desirably a hand brake, is also associated with the drum, and is adapted to be operated by a hand lever Y, located by the operator's seat, and connection Z. Thus when the device F or F' has acquired a load by being advanced near the surface of the ground, or has had a load deposited thereon, the clutch P is thrown in and the movement of the machine causes the load holding device to be raised. When at a proper elevation over the wagon or stack, the clutch is thrown out, and the pawl and ratchet prevent the load from descending, while the proper position is being secured over the stack or wagon. The lever $t$ is then moved to permit or cause the device F or F' to tilt forward discharging its contents. The clutch is then thrown in, the pawl released, and the machine backed, whereupon the device F or F' will be caused to descend slowly; or the parts described may be allowed to descend slowly by throwing out the clutch, applying the brake X and releasing the pawl V.

I prefer to support the guide frame D on the wheeled base A pivotally, so that the frame may be lowered to pass under electric wires, etc., and for convenience in storage. A convenient arrangement is to pivot the standards E to the axle N. I provide a brace, or braces, 2 for holding the frame E in upright position. Preferably each brace consists of two sections 3 and 4, hinged together, as at 5, and hinged, respectively, to the frame E and the base A, as at 6 and 7. When the frame E is erected, these braces are straightened to the line of centers, or slightly past the line of centers, so as to afford rigid support; and a stop 8 on one section of each brace may engage with the other section, to prevent the brace from collapsing inward. I may also employ novel means for raising and lowering the frame E, as follows: Cables 9 and 10 are wound reversely about the shaft or axle N. The cable 9 extends rearward from the shaft, about a sheave 11 mounted near the lower end of the mast J, thence upward along the mast, over a sheave 12 near the upper end thereof, and thence downward to a bar 13 connecting sections 3 of the two braces 2. The cable 10 extends directly to the bar 13, to which it is secured. It is of course immaterial to which of the sections 3 or 4 the cables are connected.

In operation of these parts, if the shaft N be revolved to wind the cable 9 and to unwind the cable 10 as by backing the machine, the braces 2 are flexed upward until equilibrium is destroyed and the frame D swings backward of its own weight. Then as the frame D descends, the cable 10, being taut, unwinds and permits the frame to lower gradually. To erect the frame again, the shaft N is revolved in the opposite direction by advancing the machine, when the winding of the cable 10 straightens the braces 2, thus forcing the frame D back to erect position.

Preferably the mast J is pivoted, as at 14, to the base A, so as to swing backward out of the way of the other parts, when the frame D is lowered. I may provide depending supports 15, pivoted at their upper ends, as at 16, to the standards E and which when the frame D is lowered, rest with their lower ends on the base A; if desired, their lower ends may take over pins 17.

Having thus described my invention, I claim as new and desire to secure by Letters Patent:

1. A machine of the character described, comprising a wheeled base, an upright guide frame, a frame slidable vertically on said guide frame, a rocker pivoted to the slidable frame, a load holding device pivotally carried by said rocker, means for causing the rocker to move on its pivot when the slidable frame is raised and lowered, means for moving said slidable frame vertically, and means for tilting said load holding device.

2. A machine of the character described, comprising a wheeled base, an upright guide frame, a rocker slidable vertically on said guide frame, means for raising and lowering said rocker, a load acquiring and holding device tiltably mounted at one end of the rocker and projecting forward from said wheeled base, a link connection between the other end of said rocker and the guide frame, and means for controlling the tilting of said load-holding device.

3. A machine of the character described, comprising a supporting structure having an upright guide portion, a rocker slidable vertically on said guide portion, means for raising and lowering said rocker, a load holding device tiltably mounted on said rocker at one side of said guide portion, and a link member pivoted at one end to the part of said rocker at the other side of said guide portion and at its other end to said guide portion.

4. A machine of the character described, comprising a supporting structure having an upright guide portion, a frame slidable vertically in engagement with said guide portion, a rocker pivotally supported by said frame, a load holding device tiltably mounted on said rocker at one side of said guide portion, means for controlling the tilting of said device, and a link member pivoted at one end to the part of said rocker at the other side of said guide portion and at its other end to said guide portion.

5. A machine of the character described, comprising a wheeled base, an upright guide frame, a frame slidable vertically thereon, a rocker pivoted to said slidable frame, a hoisting drum and a clutch for coupling and uncoupling said drum with respect to a wheel of said wheeled base, a load holding device supported tiltably from the forward end of said rocker, means for controlling the tilting of said load holding device, and a link connection between the rear end of said rocker and the guide frame.

6. A machine of the character described, comprising a wheeled base, an upright guide frame, a sheave at the top thereof, a frame slidable vertically on said guide frame, a rocker pivoted to said slidable frame, a hoisting drum, a cable passing from said drum upward over said sheave and downward to the slidable frame, a clutch for coupling and uncoupling said drum with respect to a wheel of said wheeled base, a link connection between the rear end of said rocker and the guide frame, a load holding device supported tiltably from the forward end of said rocker, and means for controlling the tilting of said load holding device.

7. A machine of the character described, comprising a supporting base, an upright guide frame pivotally supported on said base so as to be capable of being lowered thereover, a jointed brace comprising sections hinged together and hinged respectively to said guide frame and base, a sheave supported above said brace, a shaft, and cables wound in opposite directions about said shaft, one passing upward to said brace and the other passing over said sheave and thence downward to said brace, whereby one cable winds as the other unwinds and one exerts an upward pull in winding and the other exerts a downward pull in winding.

8. A machine of the character described, comprising a supporting base, an upright guide frame pivotally supported on said base so as to be capable of being lowered thereover, a frame slidable vertically on said guide frame, a load holding device tiltably supported from said slidable frame, a jointed brace comprising sections hinged together and hinged respectively to said guide frame and said base, a mast supported pivotally by said base to swing in the same direction as said guide frame and carrying sheaves near its upper and lower ends, a revoluble shaft, and cables wound in opposite directions about said shaft, one passing upward to said brace and the other passing about the lower sheave of said mast, thence along said mast to and over the upper sheave and thence downward to the other section.

9. A machine of the character described, comprising a wheeled base, an upright guide frame pivotally supported on said wheeled base so as to be capable of being lowered thereover, a brace for holding said guide frame erect, a depending support pivoted to said guide frame and adapted to sustain said frame when lowered, a frame slidable vertically on said guide frame, and a load holding device tiltably supported from the slidable frame.

10. A machine of the character described, comprising a wheeled base having an operator's seat, an upright guide frame, a frame slidable vertically on said guide frame, a rocker pivotally connected with said slidable frame, a load holding device supported tiltably from the forward end of said rocker, a link connection between the rear end of said rocker and the guide frame, a hoisting drum having a pawl and ratchet and brake, a clutch for coupling and uncoupling said drum with respect to one of the wheels of said wheeled base, and operating levers located adjacent said seat and connected with said tiltable load holding device, said clutch, said pawl and said brake.

11. A machine of the character described, comprising a supporting structure having an upright guide portion, a rocker slidable vertically on said guide portion, means for raising and lowering said rocker, a load holding device mounted on said rocker at one side of said guide portion, a link member pivoted at one end to the part of said rocker at the other side of said guide portion, and at its other end to said guide portion, and a brace member pivoted to said guide portion in a horizontal plane different from that of said link member, being adapted to coöperate with said rocker when the latter is horizontal to prevent the same from tilting downward and forward about a fixed axis.

12. A machine of the character described, comprising a supporting structure having an upright guide portion, a rocker slidable vertically on said guide portion, means for raising and lowering said rocker, a load holding device mounted on said rocker at one side of said guide portion, a link member pivoted at one end to the part of said rocker at the other side of said guide portion, and at its other end to said guide portion, a brace member pivoted to said guide portion in a plane above that of said link member, and a hooked stop carried by said rocker to bear against the end of said brace when said rocker is horizontal, substantially as described.

13. A machine of the character described, comprising a supporting structure having a guide frame pivotally connected at one end with the forward portion thereof, means for raising and lowering said guide frame, means for holding said guide frame erect, a frame slidable vertically on said guide frame, means for raising and lowering said slidable frame, a rocker pivoted to said slidable frame, a load-holding device tiltably mounted on the forward end of said rocker, means connecting the rear end of said rocker with the guide frame to cause the rocker to incline upward and forward when the slidable frame is raised and to incline downward and forward when the said slidable frame is lowered, and means for controlling the tilting of said load-holding device.

14. A machine of the character described, comprising a supporting structure having a guide frame, means for holding said guide frame erect, a frame slidable vertically on the guide frame, means for raising and lowering the slidable frame, a rocker pivoted to said slidable frame, a load holding device tiltably mounted on the forward end of said rocker, means for moving the rocker on its pivot when the slidable frame is raised and lowered, and means for tilting said load holding device.

In testimony whereof I have signed my name to this specification in the presence of two subscribing witnesses.

ROBERT BARTON FULTON.

Witnesses:
FRED MAURER,
L. A. GRAVES.